April 7, 1959

I. N. STEIGMAN 2,880,645

ATTACHMENT FOR MAINTAINING SYNCHRONISM
IN A FILM WINDING APPARATUS
Filed June 20, 1955

Inventor
Israel N. Steigman

Harry Jacobson
Attorney

United States Patent Office 2,880,645
Patented Apr. 7, 1959

2,880,645

ATTACHMENT FOR MAINTAINING SYNCHRONISM IN A FILM WINDING APPARATUS

Israel N. Steigman, Brooklyn, N.Y.

Application June 20, 1955, Serial No. 516,620

8 Claims. (Cl. 88—16.2)

This invention relates to the means for maintaining a motion picture film in step or in synchronism with an imperforate magnetic sound tape during the projection of the picture and the reproduction of the sound.

In amateur or inexpensive showings of sound motion pictures, the conventional projector for the picture film and the conventional sound reproducer for magnetic tape are usually independent of each other, being each operated by a separate motor, but each may take a number of different forms as marketed, thereby making it difficult to couple the projector and recorder together for simultaneous operation by mechanism applicable more or less universally to the various forms. It is also difficult to maintain the picture and sound in synchronism even when the projector and recorder have been mechanically coupled together, unless perforated magnetic tape is used in the tape recorder. Such tape being relatively expensive, as compared to similar imperforate tape, attempts have been made to employ the imperforate tape, but such use in separate projectors and tape recorders has given rise to problems in synchronization which are especially aggravated throughout a long showing.

The present invention therefore contemplates the provision of a universal powered tape take-up attachment and projector control designed to be quickly and easily interposed between the usual intermittent mechanism of any standard projector and standard tape recorder without any material change in either, to vary the feed of the picture film in precise accordance with the feed of the sound tape when necessary.

The invention further contemplates the control of the speed of the projector motor by the sound tape, this being accomplished through a feeler-operated rheostat and a powered tape take-up reel, the reel having a positively acting but flexible controlling connection to the projector mechanism operating in precise timed relation thereto, whereby the projector motor is accelerated when the picture film feed lags behind the tape feed, and the motor is decelerated when the film runs ahead of the tape.

The invention further contemplates the employment either of part of the picture film or of an endless perforated belt together with gearing as the means for positively connecting the projector mechanism to the drive mechanism for the tape take-up reel, the stress on the film or belt being minimized by the use of a flexible torque motor as the motive power for the reel.

The various objects of the invention will be clear from the description which follows and from the drawings, in which Fig. 1 is a top plan view of the attachment as it appears in its operative position interposed between a picture projector and a tape recorder.

Figure 1:
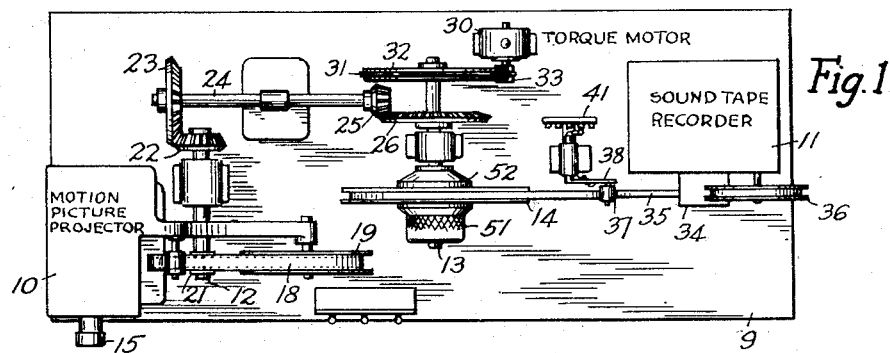
Figure 2:
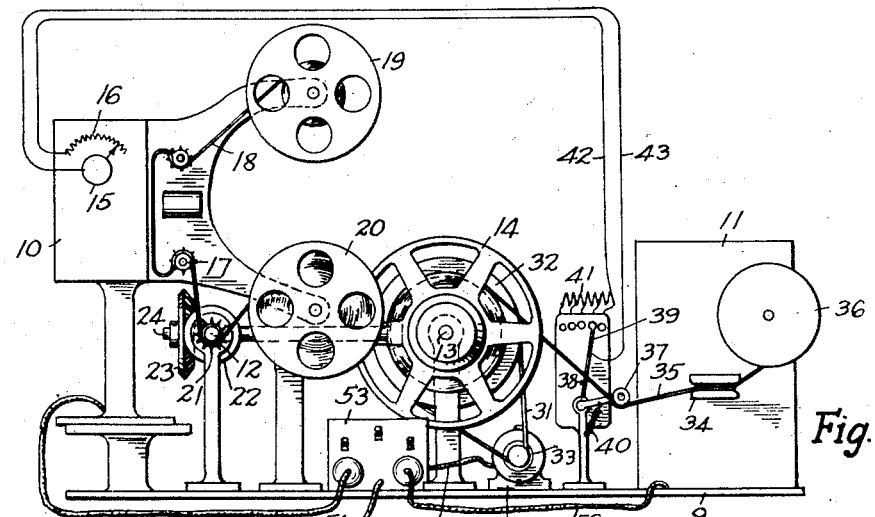
Fig. 2 is a front elevational view of Fig. 1 wherein a portion of the picture film connects the projector to the attachment.

In that form of the invention shown in Figs. 1 and 2, the base 9 of the attachment serves as a support for the picture projector 10 of conventional construction and the conventional tape recorder 11 employing imperforate tape, as well as for the sprocket and gear shaft 12 of the attachment, the shaft 13 for the tape take-up reel 14 and the other parts of the attachment soon to be described. The manually operated knob handle 15 of the rheostat 16 (Fig. 2) of the projector, controls the motor (not shown) customarily used for operating the usual intermittent mechanism of the projector in a manner in which is well understood and hence need not be described nor further illustrated. Said mechanism includes the sprocket wheel 17 of the projector and serves in the usual manner to draw the picture film 18 off the film pay-out reel 20 which is driven in the usual manner. To avoid the need for attaching a gear wheel to one of the shafts of the projector mechanism or for otherwise materially changing such mechanism in a manner not easily accomplished in the home or by amateurs who usually lack the proper equipment to make such changes, the perforated picture film 18 is utilized as the means for controlling the speed of the tape take-up in precise conformity with the speed of operation of the projector motor.

Said film is passed around the control sprocket wheel 21 on one end of the gear shaft 12 which carries a suitable gear 22 at the other end thereof. Where the shaft 13 for the tape take-up reel must be in relatively distant spaced relation or disposed in non-parallel relation to the gear shaft 12, bevel gearing is preferably used operatively to connect the shafts 12 and 13. The gear 22 of Figs. 1 and 2 is consequently a bevel gear meshing with the bevel gear 23 at one end of the intermediate gear shaft 24 which carries the bevel gear 25 at the other end thereof. On the reel shaft 13 is the bevel gear 26 meshing with the gear 25, whereby the rotation of the tape take-up shaft 13 is governed by and in conformity with the rotation of the gear shaft 12, which is in turn controlled by the picture film 18. From the sprocket wheel 21 the picture film passes to the take-up reel 20.

To avoid the stress on the film 18 which would result if the film were used as the means for supplying the motive power to the gearing of the attachment and to the reel 14, a torque motor 30 is utilized to supply as much or as little power as becomes necessary to drive the shaft 13 and the parts carried thereby and connected thereto. Such torque motor is of the type wherein acceleration and deceleration of the motor speed or increase or decrease in the load do not result in damage to the motor. Instead, the motor exerts the required torque from zero to the maximum required and is designed to operate effectively under variations in speed and in loading. Power is supplied by the motor 30 to the shaft 13 through the belt 31 which engages the pulley 32 on said shaft 13 and passes around the pulley 33 of the motor. The gearing connecting the shafts 12 and 13 prevents either shaft from running ahead of or behind the other. Through the length of flexible perforated picture film between the sprocket wheels 17 and 21, the relative speeds of the shaft 13 and the sprocket wheel 17 of the projector mechanism are held at a ratio which always remains precisely the same. The speed of rotation of the tape take-up reel is consequently controlled by the speed of the projector mechanism and is automatically altered in conformity with any change in speed of said mechanism.

The sound tape 35 is preferably driven at a constant speed in the usual manner through the recording and reproducing head 34 of the tape recorder 11. Said tape is drawn off the tape pay-off reel 36 and instead of passing directly from the head to the tape take-up reel in the customary manner, the tape is first arranged underneath the spring-pulled roller 37 on one arm of the feeler bell-crank-lever 38 so that a portion of the tape between the reel 14 and the head 34 is depressed by said roller at all times and maintained taut. The lever is pivotally mounted on a suitable standard upstanding from the base 9 and carries on its arm 39 a suitable contact member. A spring as 40 urges the roller into pressed contact with the tape 35 and tensions the tape and also urges the arm 39 of the lever toward the right hand end of the rheostat 41, which is arranged in the circuit to the projector motor rheostat 16 by means of the conductors 42, 43, said rheostat 16 being set in advance at maximum resistance.

As the arm 39 swings about its pivot on variations in the tautness of the tape which result from variations in the speed of the projector motor, the speed of said motor is increased if the motor has run slowly enough to permit the depressed portion of the tape to slacken or to become less taut and to permit the roller 37 to drop and to swing the arm 39 clockwise. The projector motor speed is decreased if the motor has run fast enough to increase the tautness of the tape and to raise the roller 37 and to swing the arm 39 counterclockwise. Movement of the arm 39 of the rheostat 41 operates to increase or decrease the resistance in the circuit to the projector motor thereby to vary the projector speed enough to maintain the tape at the proper tension so that it is wound on the reel in reproduction at the same tension as in recording, the tape roll is wound tightly and synchronism is maintained.

To minimize the effect of increase in diameter of the roll of tape wound on the reel 14 as recording or reproduction of sound proceed, the reel is made of as large a diameter as is convenient and recording of the sound is made by the use of the attachment whereby the reel and the picture film are driven during recording in precisely the same manner as during projection and reproduction and with the same tight winding of the tape roll. Consequently, variations in the linear speed of the tape at the take-up reel due to changes in diameter of the wound roll do not materially affect the synchronism of the picture and sound, as will be clear from the disclosure in my copending application Serial No. 494,414 filed March 15, 1955 to which reference is hereby made.

Figure 4:
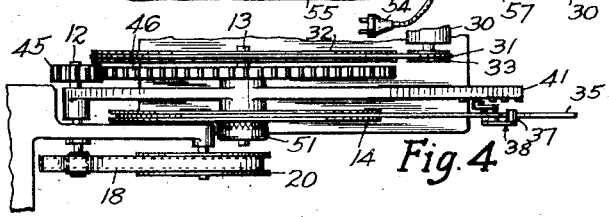
Fig. 4 is a top plan view of Fig. 3.
Figure 5:
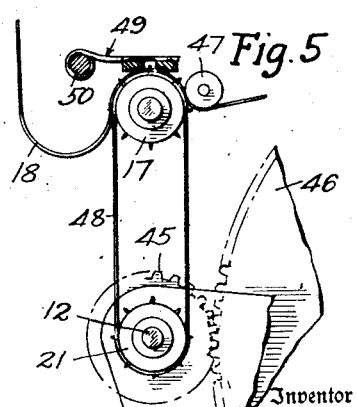
Fig. 5 is a fragmentary enlarged elevational view similar to Fig. 1 of the flexible belt and the adjacent parts.
Figure 3:
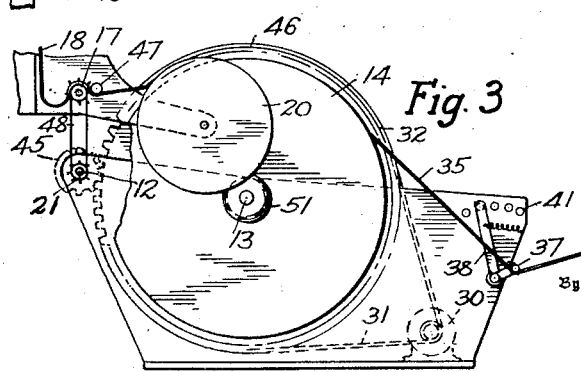
Fig. 3 is a fragmentary elevational view similar to Fig. 1 of a modified form of the attachment wherein a perforated or sprocket belt connects the attachment to the projector.

In that form of the invention shown in Figs. 3–5, the gearing between the sprocket wheel 21 of the attachment and the reel shaft 13 comprises merely the spur gear 45 on the shaft 12 and the meshing spur gear 46 of relatively large diameter on the reel shaft 13. Furthermore, the picture film 18 is not carried around the sprocket wheel 21 but instead is carried to the film take-up reel 20, an idler roll 47 being arranged if desired, in position to insure proper advance of the film in a well known manner. No stress resulting from a driving or control operation is put on the picture film, a separate thin metallic or the like endless flexible belt 48 of about the width of and perforated at its edges like the picture film replacing the length of such film between the sprocket wheels 17 and 21 shown in Fig. 2 and being arranged inwardly of the picture film around the wheel 17. The perforations of the belt are engaged by the teeth of the sprocket wheel 17 in the same manner as are the perforations in the usual picture film. To insure that both film and belt are properly advanced by the sprocket wheel, a resilient film retainer 49 (Fig. 5) of any well known type may optionally be employed. As shown, said retainer comprises a torsion spring mounted on a suitable fixed pin 50 fixed to the projector frame, a free end portion of the spring extending over the sprocket wheel 17 and carrying a felt or the like compressible pad pressed by the spring toward the wheel 17 and holding the film and belt tightly on the wheel for movement as a unit therewith.

The tape take-up reel is removably secured to the shaft 13 in any suitable manner so that the synchronism of sound and picture may be initially established, as by rotation of the reel relatively to the shaft until synchronization marks on the apparatus and on the film and tape are respectively aligned. As shown, the hand nut 51 on the shaft 13 clamps the reel 14 to its shaft by pressing the reel against the washer 52 (Fig. 1) which is fixed to the shaft. When the nut is loosened, the reel may be adjusted or removed. A switch panel 53 (Fig. 2) distributes the current received through the plug 54 to the projector through the conductor 55, to the tape recorder through the conductor 56, and to the torque motor through the conductor 57.

It will now be seen that to insure synchronism of sound and picture, the sound is recorded on the tape while the attachment is in place and the film is being run; that during recording the tape is fed at a constant speed and that the differences in rotational take-up speed are minimized by the tight winding of the tape in a roll of relatively large diameter, that for each film portion there is a corresponding tape portion, though the length of the tape portion may vary slightly for the same length of picture film at different stretches between the beginning and the end of the film; that when reproduction of the sound is performed by the use of the attachment and the use of a tape take-up reel of the same diameter as that used for recording, synchronism once established is maintained automatically throughout the run; that to arrange the attachment in place, all the operator need do is either to thread the film about the sprocket wheel of the attachment before securing it to the film take-up reel, or else to arrange the belt 48 under the film on the lower sprocket wheel of the intermittent mechanism of the projector, as well as threading the tape under the roller 37 and on to the tape take-up reel and establishing initial synchronism of the film and tape in the usual manner, and that the attachment is well designed for its intended purposes besides being simple, inexpensive and effective.

While certain specific forms of the invention have herein been shown and described, various obvious changes may be made therein without departing from the spirit of the invention defined in the appended claims.

I claim:

1. A synchronizing attachment adapted to be arranged bodily as a unit between a motion picture projector having a loop sprocket wheel and a tape recorder employing imperforate magnetic tape, said attachment comprising a first shaft independent of the projector, a second sprocket wheel on the shaft, a second shaft in spaced relation to the first shaft, a tape take-up reel for imperforate magnetic tape on the second shaft, toothed gearing positively connecting the shafts for operation as a unit at a constant and non-slipping velocity ratio, a perforated flexible member adapted to engage the loop sprocket and engaged by the second sprocket wheel for rotating said second sprocket wheel positively, and power-supplying means rotatable continuously at varying speeds for driving the second shaft at speeds governed by the rotation of the first shaft.

2. The attachment of claim 1, the member comprising that portion of the picture film advanced by the projector subsequent to the projection of the pictures thereon and prior to the winding thereof on a film take-up reel of the projector.

3. The attachment of claim 1, a spring-pulled roller engaging a depressed portion of the tape fed by the tape recorder between said recorder and the reel, and a rheostat arranged in the circuit to the motor of the projector and having an operative connection to the roller.

4. The combination with an attachment for maintaining synchronism of sound reproduced from imperforate magnetic tape fed at a uniform rate by a tape recorder and the picture projected from perforated picture film of a motion picture projector having a film-advancing sprocket wheel and a motor to operate the wheel and a tape recorder for continuously feeding imperforate magnetic tape, said attachment being movable bodily into and out of operative position between the recorder and the projector and comprising a tape take-up reel to wind up the tape fed by the tape recorder, means for depressing and tensioning a length of tape between the recorder and the reel, means responsive to variations in the tautness of the length of tape to vary the current fed to the projector motor thereby to vary the speed of rotation of the sprocket wheel of the projector, a second sprocket wheel rotatably carried by the attachment in spaced relation to the reel, a flexible perforated member engaging the sprocket wheels and controlling the rotation of the second sprocket wheel, toothed gearing operatively and positively connecting the second sprocket wheel to the reel to maintain the velocity ratio of said wheels constant, and a torque motor having an operative connection to the reel and supplying motive power thereto and thereby relieving the flexible member of excessive stress.

5. The attachment of claim 4, a shaft for the second sprocket wheel, a second shaft for the reel, and intermeshing gear wheels on the respective shafts constituting said toothed gearing.

6. The attachment of claim 5, the flexible member comprising an endless thin metallic belt having perforations therein adapted to be engaged by the sprocket wheels.

7. The attachment of claim 4, the flexible member being the picture film advanced by the first sprocket wheel.

8. The combination of a projector for motion picture film, a sound tape recorder for imperforate magnetic tape and an attachment interposable as a unit between and removable as a unit from between the projector and the recorder without alteration of the mechanisms of the projector and the recorder, the projector being of the type having a motor, intermittent mechanism and a film take-up reel and a loop sprocket wheel, the recorder being of the type having a motor to advance the tape at a constant speed, said attachment comprising a tape take-up reel to receive the tape from the recorder, a shaft for the tape reel, means for supporting the shaft, a second sprocket wheel adapted to be positioned adjacent the film take-up reel, gearing means forming a positive operative connection between the shaft and the second sprocket wheel, flexible means engaging the sprocket wheels and adapted to be advanced by the loop sprocket wheel thereby to rotate the second sprocket wheel at a speed corresponding to the speed of the projector motor, a torque motor to drive the shaft at a speed determined by the second sprocket wheel and to relieve the flexible means of excessive stress, and means responsive to variations in the speed of rotation of the tape take-up reel to vary the speed of the projector motor sufficiently to compensate for variations in the relative speeds of advance of the film and tape and thereby to maintain constant the velocity ratio of the picture film advanced by the projector and the film advanced by the recorder.

References Cited in the file of this patent

UNITED STATES PATENTS

| | | |
|---|---|---|
| 1,866,712 | Jones | July 12, 1932 |
| 2,136,209 | Finch | Nov. 8, 1938 |
| 2,389,047 | Heinz | Nov. 13, 1945 |
| 2,548,488 | Mella | Apr. 10, 1951 |

FOREIGN PATENTS

| | | |
|---|---|---|
| 1,055,220 | France | Oct. 14, 1953 |